US00RE35920E

United States Patent [19]

Sorden et al.

[11] E Patent Number: Re. 35,920

[45] Reissued Date of Patent: Oct. 13, 1998

[54] EVENT-ACTIVATED REPORTING OF VEHICLE LOCATION

[75] Inventors: James L. Sorden, Saratoga; Terry J. Smith, Campbell; Eric Klein, Mountain View, all of Calif.

[73] Assignee: Trimble Navigation Limited, Sunnyvale, Calif.

[21] Appl. No.: 644,423

[22] Filed: May 10, 1996

Related U.S. Patent Documents

Reissue of:

[64] Patent No.: 5,311,197
Issued: May 10, 1994
Appl. No.: 11,989
Filed: Feb. 1, 1993

[51] Int. Cl.[6] ..... G01S 3/02

[52] U.S. Cl. ..... 342/457; 342/357

[58] Field of Search ..... 453/457, 50, 357

[56] References Cited

U.S. PATENT DOCUMENTS

| | | | |
|---|---|---|---|
| 4,300,040 | 11/1981 | Gould et al. . | |
| 4,340,810 | 7/1982 | Glass . | |
| 4,511,887 | 4/1985 | Flore . | |
| 4,577,182 | 3/1986 | Millsap et al. . | |
| 4,636,950 | 1/1987 | Caswell et al. . | |
| 4,646,343 | 2/1987 | Chen . | |
| 4,651,157 | 3/1987 | Gray et al. . | |
| 4,658,096 | 4/1987 | West, Jr. et al. . | |
| 4,688,244 | 8/1987 | Hannon et al. . | |
| 4,697,281 | 9/1987 | O'Sullivan . | |
| 4,737,975 | 4/1988 | Shafer . | |
| 4,740,792 | 4/1988 | Sagey et al. | 342/475 |
| 4,750,197 | 6/1988 | Denekamp et al. . | |
| 4,775,997 | 10/1988 | West, Jr. et al. . | |
| 4,897,642 | 1/1990 | DiLullo et al. . | |
| 4,910,493 | 3/1990 | Chambers et al. . | |
| 4,972,457 | 11/1990 | O'Sullivan . | |
| 5,023,900 | 6/1991 | Tayloe et al. . | |
| 5,032,845 | 7/1991 | Velasco . | |
| 5,068,656 | 11/1991 | Sutherland . | |
| 5,119,102 | 6/1992 | Barnard | 342/457 X |
| 5,223,844 | 6/1993 | Mansell et al. . | |

FOREIGN PATENT DOCUMENTS 0242099 10/1987 European Pat. Off. .

*Primary Examiner*—Mark Hellner
*Attorney, Agent, or Firm*—William E. Pelton, Esq.

[57] ABSTRACT

Apparatus that is carried on a land vehicle, a marine vehicle or vessel, or an airborne vehicle or vessel for notifying others that a vehicle accident or other abnormal situation has occurred and for notifying others of the location of the vehicle at the time of the accident. The vehicle carries an distance measuring system (DMS) signal antenna and receiver/processor that receives DMS-type signals from one or more DMS signal broadcasters and determines the present position of the vehicle, plus an activatable transmitter. The vehicle also carries an abnormality sensing means that senses the occurrence of an accident or other abnormal situation involving the vehicle or a vehicle occupant. When an abnormal situation is sensed, the abnormality sensing means automatically activates the transmitter, which then communicates the fact that an abnormal situation has occurred and the location of the vehicle at the time the event occurred. Alternatively, the abnormality sensing means can activate the transmitter only after a vehicle operator has taken affirmative action indicating that the transmitter should be activated. Optionally, the transmitter can also communicate the time the event occurred. If the abnormal situation is (1) a vehicle accident, (2) inoperability of the vehicle, (3) inability of the vehicle operator or other vehicle occupant to continue (e.g., because of a rapid change in a present health condition of the occupant), the transmitter can also communicate information on (1) the severity of the accident, (2) the type or cause of vehicle inoperability, (3) the reason the operator or other occupant is unable to continue. Optionally, the system can also transmit, or hold for future analysis, the values of one or more vehicle operating parameters sensed at a sequence of times preceding occurrence of the abnormal situation. The DMS may be a Satellite Positioning System, such as the Global Positioning System (GPS) or the Global Orbiting Navigation System (GLONASS), or a ground-based radionavigation system, such as LORAN, Shoran, Decca or TACAN.

49 Claims, 2 Drawing Sheets

EVENT-ACTIVATED REPORTING OF VEHICLE LOCATION

Matter enclosed in heavy brackets [ ] appears in the original patent but forms no part of this reissue specification; matter printed in italics indicates the additions made by reissue.

FIELD OF THE INVENTION

This invention relates to determination of location of a vehicle upon occurrence of an event, and more particularly to determination of vehicle location by a satellite-based or ground-based radiowave navigation system.

BACKGROUND OF THE INVENTION

When a land vehicle, such as an automobile, bus or truck, or a marine or airborne vessel encounters an abnormal situation, such as a collision, loss of vehicle control or abrupt inoperability of the vehicle, a safety device attached to the vehicle is activated to minimize injury or damage to the vehicle occupants or to the vehicle itself. The safety device may be an air bag or other vehicle or passenger safety mechanism, activated in response to an imminent or extant vehicle collision, or may be a redundant or parallel power supply or mechanical control device for the vehicle. Normally, such device is activated automatically by a signal issued by a vehicle sensor that senses and responds quickly to occurrence of any one of a predetermined group of abnormal vehicle conditions. If this abnormal condition threatens the health or safety of a vehicle occupant, it might be preferable to issue a distress signal automatically and at once, without waiting for a volitional act by a vehicle occupant.

Several workers have attempted to provide for broadcasting of distress signals when a vehicle experiences a collision or some other disabling condition. Graham, in U.S. Pat. No. 3,441,858, discloses an electronic calling and reply system that may be activated, either automatically or manually, to broadcast one of a selected group of distress signals after a vehicle accident occurs. The vehicle carries one transceiver unit. A central aid station has a second transceiver unit that responds to receipt of the distress signal by broadcasting a unique coded signal indicating that assistance is being sent to the vehicle. The distress signal may indicate that (1) a vehicle tow truck is needed, (2) an ambulance is needed, or (3) both a tow truck and an ambulance are needed. The distress signal is automatically sent by the vehicle-mounted transceiver when vehicle impact of sufficient magnitude occurs, as in a collision.

A vehicle distress tone generator that produces a selected one of three different tones is disclosed in U.S. Pat. No. 3,461,423, issued to Trumble. The distress signal can be automatically broadcast in response to occurrence of a vehicle accident or can be manually initiated by a vehicle occupant. The three tones broadcast correspond to three predetermined levels of severity of the accident.

In U.S. Pat. No. 3,646,583, Scuderi discloses automatic vehicle accident signalling apparatus, including a sensor that senses that a vehicle collision of a predetermined severity level (or more) has occurred. The accident signal is, presumably, received and answered by a central assistance station or by another vehicle. This patent is concerned primarily with the mechanics and electronics of collision sensing and signal broadcasting. None of the patents discussed thus far discusses means for determining where the vehicle in distress is located.

Angeloni discloses a highway distress signal broadcast system, in U.S. Pat. No. 3,828,306, in which the vehicle is located by triangulation by three or more nearby radio direction finding devices (RDFs), such as the old Mariner MR-18 marketed by Heathkit. Each RDF receives the vehicle distress signal and determines the direction of the signal source. A central station receives this information from the RDFs, determines the location of the vehicle in distress, and dispatches assistance for the vehicle. The RDFs must be located within 15 miles of the accident scene., the vehicle transmitter has low power ($P \leqq 10$ Watts), and the contemplated broadcast frequency is about 450 MHz.

Gleitz et al disclose apparatus having a vehicle impact sensor and a vehicle deformation sensor attached to a vehicle in U.S. Pat. No. 3,990,040. The apparatus broadcasts a first distress signal if vehicle impact is sensed and broadcasts a second distress signal if vehicle deformation is sensed, and the transmitter continues to broadcast after activation. Broadcast of vehicle location by the transmitter is not discussed.

Edelbock disclose a low technology solution in U.S. Pat. No. 4,091,369, a collision-responsive alarm that is attached at the top of a vehicle. If the vehicle collides with another object, a light source, rotating reflector and warning light is activated. Light from the source is reflected in a circular pattern by the rotating reflector, thus advising other persons nearby that a vehicle collision has occurred. No electromagnetic distress signal is broadcast by this apparatus.

A vehicle emergency signal system using Citizens Band (CB) radio channels is disclosed by Flickshu et al in U.S. Pat. No. 4,216,545. When a vehicle accident occurs, an emergency switch (manual or automatic) activates a CB radio transceiver carried in the vehicle, and the transceiver broadcasts a distress signal in each of a sequence of CB radio bands and then is set to Channel 9, the only CB emergency channel, to receive inquiries or other information from nearby CB radio users. By sequentially broadcasting the vehicle distress signal in each CB channel, the inventor contemplates that some CB users will hear and respond to the distress signal. However, this requires that at least one occupant of the vehicle in distress be in condition to receive the CB inquiries and be able to provide the location of that vehicle.

In U.S. Pat. No. 4,229,725, issued to Marcus, vehicle location indicator apparatus provides a visual readout of the last mile marker the vehicle has passed and of the distance (fraction of a mile) traveled by the vehicle since that last marker was passed. The apparatus is operable only for travel on a road or highway on which mile marker sensors are located at regular spatial intervals. A counter in the vehicle is initially set equal to zero and then is incremented as successive mile markers are passed. Particular events that may occur at particular mile markers can be stored in the apparatus and then displayed to the vehicle occupants as the vehicle approaches the stored event mile marker. An optional keyboard allows a vehicle occupant to enter relevant information as the vehicle proceeds.

Juhasz et al disclose a vehicle monitoring and recording system in which a plurality of sensors provide continuous or intermittent measurements of vehicle and engine operating parameters, in U.S. Pat. No. 4,258,421. These measurements are stored in a computer, which may be carried on the vehicle or may be spaced apart from the vehicle and connected to the sensors by a portable data link. The operating parameters provided by the sensors may be compared with fixed parameter limits to assess the present operating performance of the vehicle.

A vehicle emergency or distress signal broadcasting system is disclosed in U.S. Pat. No. 4,369,426, issued to Merkel, in which the distress signal also indicates the vehicle location. Distress signal transmission is activated by sensors that sense occurrence of a vehicle collision, or some other recognizable, non-normal event. These sensors may have different activation thresholds that correspond to the severity of the collision and may thereby cause transmission of different distress signals. Vehicle location is determined (probably by triangulation) by a plurality of geographically distributed stations that are electronically connected with a central data processing station. Information received by the central station may indicate the severity of the collision and whether certain safety equipment, such as seat belts or air bags, was operable when the collision occurred.

Zottnik, in U.S. Pat. No. 4,638,289, discloses use of a short time data recordation and storage system that continuously records and temporarily saves measurements of vehicle operating parameters as the vehicle moves. The recorded data are stored in a modest size buffer that is overwritten by new data after a fixed time interval ($\Delta t \approx 1$–30 sec). If a vehicle accident occurs, operating data in the buffer at that time are "frozen" and not subsequently overwritten. Data preserved in the buffer are then available to provide a perspective on what happened in a time interval immediately preceding the vehicle accident.

Murakami positions a plurality of transmitting antennae at various locations and orientations on a vehicle in U.S. Pat. No. 4,717,904. An emergency or distress signal is transmitted by a transmitter connected to these antennae whenever a serious abnormality is sensed in vehicle operation. This abnormality may be vehicle acceleration/deceleration (as in a vehicle collision), sharp change in vehicle inclination (as when a vehicle abruptly moves over the edge of an incline) or the unexpected presence of water within the vehicle (as when a vehicle abruptly encounters a river or other large body of water). The distress signal is broadcast sequentially from each of the antennae so that inoperability of one or a few antennae will not permanently preclude broadcast of the vehicle distress signal.

A vehicle location system activated by vehicle motion, vehicle collision, vehicle theft or other abnormal event is disclosed by Sagey et al in U.S. Pat. No. 4,740,792. Each vehicle has a transmitter attached thereto that has a unique transmission signal signature, and a signal broadcast by such a vehicle is received and relayed by each of three or more satellites or signal relay towers that communicate directly with one or more central data processing stations distributed throughout the U.S. A central station receives a relayed signal and identifies the transmitter, and thus the associated vehicle, by the signature. The transmitter can broadcast a signal with first frequency if the vehicle is stationary, a signal with a second frequency if the vehicle is in motion, a signal with a third frequency if the vehicle is being tampered with or stolen, and a signal with a fourth frequency if a vehicle collision is imminent or has already occurred. Optionally, a stationary transmitter with known position broadcasts a signal that is also received by the central station. The known and computed positions of this stationary transmitter are compared at the central station to calibrate the system and provide corrective adjustments of locations of the other vehicle transmitters. The satellites or signal relay towers receive location-determining signals from the vehicle, which is the inverse of the situation in the subject invention.

Takai discloses, in U.S. Pat. No. 4,743,913, a hybrid navigation system in which vehicle location and velocity vector are determined by an on-board geomagnetic sensor that senses the local geomagnetic field direction. The system also uses location information derived from GPS. However, it appears that the system is intended to operate only on a predetermined system of straight roads.

In U.S. Pat. No. 4,815,840, Benayad-Cherif et al disclose a position locating system for a robot vehicle that uses a plurality of elevated towers that each emit a guidance beacon. The beacons are received by sensors in, and provide individually coded guidance signals for, the vehicle, using triangulation or phase shift techniques. The location of the robot vehicle may be determined on board, but this location is not communicated to another entity.

Manion discloses a burst collision avoidance system for aircraft ground-based, aircraft-servicing vehicles and structures that provides warnings and avoidance maneuvers, in U.S. Pat. No. 4,835,537. The system provides telemetry equipment and a computer aboard each such vehicle and structure to determine and broadcast the present location and intended direction of movement for each such vehicle and structure. Information thus broadcast is received by each vehicle and structure in the local region and used to determine if a collision is imminent. A Global Positioning System or other means for location determination provides each vehicle with its current location information. This system requires constant transmission and receipt of location signals and substantial computer power to receive and process all incoming location signals.

A locator system for a movable vehicle is disclosed in U.S. Pat. No. 4,884,208, issued to Marinelli et al. Each of a plurality of fixed location transceivers communicates with a satellite through a first antenna and receives signals emitted by nearby vehicles individually through a second antenna. The strength of the signal received by the second antenna from a nearby vehicle determines its distance from the transmitter and second antenna. The transceivers receive and relay the vehicle signals to the satellite, which serves as a master data processing station and determines these vehicle-second antenna distances. Each transceiver serves as a local object locator station but has a relatively small effective diameter ($\approx$20 miles).

Scribner et al disclose a vehicle tracking system that transmits the location of a vehicle whenever one or more predetermined events occurs, in U.S. Pat. No. 5,014,206. The vehicle carries sensors that respond to occurrence of a predetermined event and carries a Global Positioning System or LORAN navigational system that receives vehicle location information, such as longitude and latitude. This vehicle location information is stored in a memory on board the vehicle only when one or more of the predetermined events occurs. The vehicle location information is assumed to be read out when the vehicle returns to a home base.

Barnard, in U.S. Pat. No. 5,119,102, discloses a vehicle location system that uses provides a Global Positioning System signal receiver, temporary signal storage and signal retransmitter aboard each vehicle whose location is to be monitored. The signals received by the receiver are rebroadcast at fixed times and received by a base station, which also receives the GPS signals directly from the GPS satellites. The base station determines the location of each vehicle, using time delays calculated for GPS signals received from that vehicle. The system provides no indication of occurrence of an unusual event, such as a collision or imminent collision.

Vehicle location apparatus, carried on each vehicle that communicates with a base station, is disclosed in U.S. Pat.

No. 5,142,281, issued to Park. Each vehicle determines its current location and, upon receipt of a command signal from the base station, transmits its current location to the base station. No special message is included by a transmitting vehicle indicating the presence of an unusual condition or event affecting that vehicle.

What is needed is a system that automatically broadcasts a vehicle distress signal, including the present location of the vehicle in distress and the time of first broadcast, whenever and wherever the vehicle encounters or experiences any one of a group of predetermined abnormal events or conditions. The system should preferably allow broadcast of the type of abnormality encountered, an assessment of the level of severity of the abnormality and information on the condition of the vehicle prior to and at the time the abnormality occurred. Preferably, the system should not be limited to operation in a geographically restricted region and should not require that the vehicle be confined to a predetermined road system.

SUMMARY OF THE INVENTION

These needs are met by the invention, which provides apparatus for broadcasting the present location of a vehicle in distress, this location being determined by a signal transceiver and processor attached to the vehicle and controlled by a ground-based radionavigation system, such as LORAN, Shoran, Decca or TACAN, or by a satellite-based radionavigation system, such as a Satellite Positioning System (SPS). The SPS may be a Global Positioning System (GPS), a Global Orbiting Navigational System (GLONASS), or any other satellite-based system for determination of location and/or observation time for a point on or adjacent to the Earth. These radionavigation systems are referred to collectively herein as distance measuring systems ("DMSs").

Where satellite-based signals are used, an SPS antenna and receiver/processor carried on a vehicle receives different coded signals from each of two or more SPS satellites, placed in non-geosynchronous orbits around the Earth. The SPS continuously or intermittently determines the present location of the SPS antenna, based upon the relative and absolute times each coded signal is received and any frequency shifts that occur for each such signal.

Where ground-based signals are used, a vehicle-mounted antenna and receiver/processor receive two or more timed DMS signals from fixed, ground-based transmitters and determines, from the timing differences or other signal characteristics, the vehicle location relative to the known positions of the transmitters.

A Long Range Navigation (LORAN) antenna and transceiver/processor receives time pulses from a master station and pulses from two or more spaced apart secondary stations that are synchronized to the master station pulses. The time difference between receipt of the distinguishable master station pulse sequence and each of the secondary station pulse sequences is used to determine the position of the LORAN antenna by triangulation. Shoran and Decca are similar to LORAN.

A TACAN antenna and receiver/processor system is ground-based and combines features of a distance measuring system with direction-finding features, using a single transmitting station. A TACAN system uses a rotating non-uniform antenna pattern, superimposed on a fixed non-uniform antenna pattern, to provide accurate bearing information.

The DMS-determined present location of the vehicle is only broadcast in response to (imminent or extant) occurrence of an abnormal vehicle event or condition, as determined by one or more vehicle operating sensors attached to the vehicle. Optionally, the system can also broadcast previously-sensed and temporarily-stored information on vehicle operating parameters present just before or at the time the abnormality occurred.

The invention communicates the present location of the vehicle automatically or, optionally, only after affirmative action is taken by an occupant of the vehicle. The vehicle may be located anywhere on the Earth's surface. Communication may be by broadcast on one or more vehicle emergency frequencies, such as CB Channel 9, marine channel 16 or the corresponding aviation channels, or the invention may include a cellular telephone that communicates the vehicle event or condition information to an emergency reporting facility, such as the 911 telephone number of a local telephone company. Optionally, the invention can communicate other information as well, such as the nature and/or severity of the abnormal event or condition and the time this event or condition occurred.

DESCRIPTION OF THE PREFERRED EMBODIMENT

Figure 1:
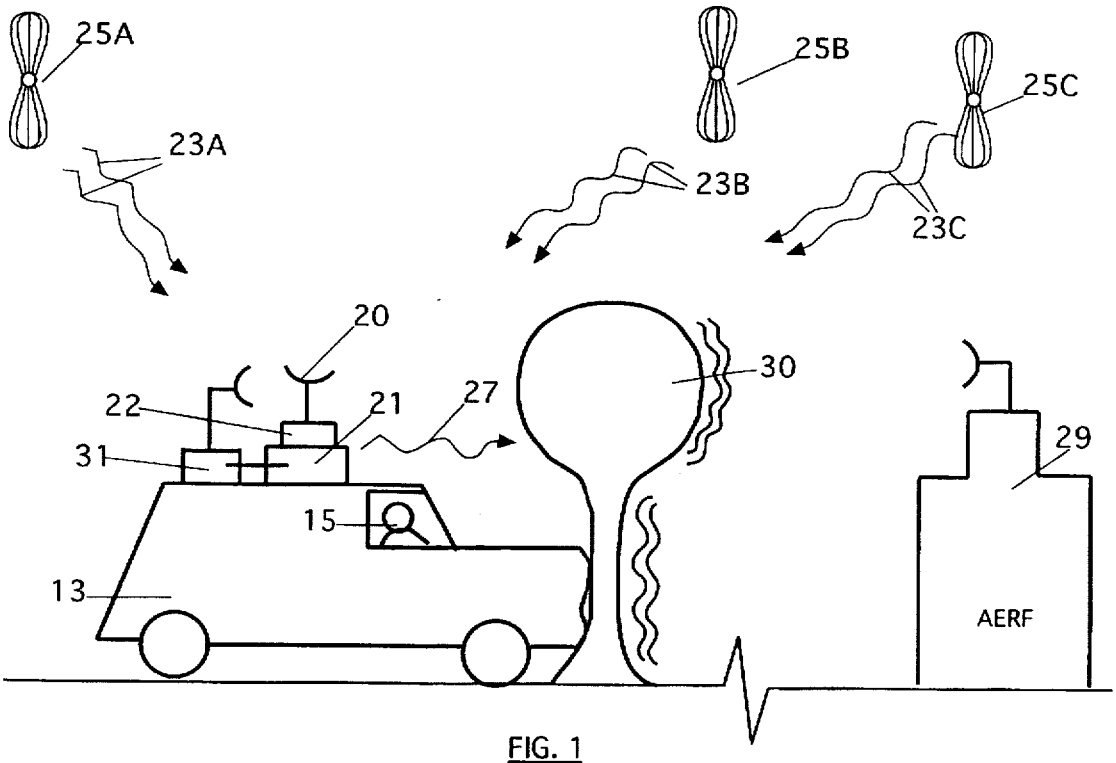
FIG. 1 is a schematic view of an embodiment of the invention in use where a vehicle abnormal event or condition has occurred, where a satellite-based radionavigation system is used.

FIG. 1, which is not drawn to scale, illustrates the invention in use, where a monitored vehicle 13 or vehicle operator or occupant 15 encounters an abnormal event or condition (abnormal "situation"), using a satellite-based radionavigation system. The abnormal situation may be collision or crash of the vehicle 13, "rolling" or side-over-side rotation or tumbling of the vehicle, sudden immersion of the vehicle in water or another liquid, unexpected inoperability of the vehicle, unexpected inability of the vehicle operator to continue to operate the vehicle (e.g., because of a sudden change in the present health condition of the operator or another vehicle occupant), or any other abnormal situation that can be distinguished by one or more sensors carried on the vehicle or on a vehicle occupant. The vehicle 13 carries a DMS antenna 20 and an activatable DMS (here, SPS) signal receiver/processor 21 that receives DMS-type signals 23A, 23B and 23C from two or more DMS signal broadcasters 25A, 25B and 25C (here, satellites). These DMS signals are processed by the receiver-processor 21 to determine the present location of the DMS antenna 20 and, therefore, of the vehicle 13 on which the antenna is carried. This present location information is transmitted, at an appropriate time, by a signal transmitter 22 connected to the receiver/processor 21. Present vehicle information can be presented in longitude and latitude coordinates, and optionally includes an elevation coordinate indicating the height of the vehicle above or below a reference horizontal plane. The vehicle 13 may be a land vehicle, a marine vessel or vehicle or an airborne vessel or vehicle, although only a land vehicle is shown in FIG. 1.

The transmitter 22 is activated by receipt of an abnormal situation signal from an abnormal event sensor 31 that is carried on the vehicle, or on an occupant of the vehicle, such as the vehicle operator, and that is electronically connected to the receiver/processor 21. The abnormal event sensor 31 might be connected to an on-board, collision-activated air bag or other device that is activated when a specified abnormal event or class of events occurs. When the abnormal event sensor 31 senses occurrence of one or more of a selected group of abnormal situations involving the vehicle 13 or vehicle operator/occupant 15, this sensor issues a transmitter activation signal, and the transmitter 22 is activated and begins transmitting a vehicle "distress" signal 27. The distress signal 27 communicates the fact that an abnormal situation has occurred and the location of the vehicle at the time the abnormal situation first occurred.

Optionally, the transmitter 22 can also communicate the time the abnormal situation first occurred and/or information concerning (1) the type or cause of the situation, (2) the severity of the situation, (3) the condition of the vehicle operator/occupant (if related to inability of the operator/occupant to continue), (4) the orientation of the vehicle relative to a reference orientation., and/or (5) the present location of the vehicle. Vehicle location and other relevant information at the time the abnormal situation occurred may be transmitted once or periodically. Alternatively, present vehicle location and other relevant information may be transmitted as vehicle location changes, after occurrence of the abnormal situation. This alternative would be appropriate where the location of the vehicle may continue to change after the abnormal situation occurs, for example, where a marine vessel drifts with the current.

Optionally, the vehicle 13 can also carry one or more vehicle operating parameter sensors 33, and one or more registers or memories 35 for temporary storage, connected to the sensors 33, for continuously sensing and storing parameter values such as vehicle speed, vehicle heading, engine temperature, etc. Information sensed by the sensors 33 could be stored in first in-first out registers 35 that store parameter values sensed during the a preceding time interval of length $\Delta t_S$, such as the preceding five seconds. When an abnormal situation occurs, the sensors 33 are immediately disabled so that the vehicle operating parameter values sensed and stored in the time interval of length $\Delta t_S$ immediately preceding occurrence of the abnormality are available for subsequent read-out. The information now stored in a register 35 can be read out "at the scene", analogous to read-out of "black box" information after crash of an aircraft. Alternatively, some or all of the information held by the registers 35 can be automatically or discretionarily transmitted by the transmitter 22 when an abnormal situation occurs. A sensor 33 can be one or more accelerometers oriented in one or more directions relative to a vehicle axis. Alternatively, a sensor 33 can be a local magnetic field sensor that senses the direction of a vehicle axis relative to a local coordinate system defied by the local magnetic field.

Communication of vehicle location and other relevant information may be through broadcasting by the transmitter 22 of such information on one or more designated Emergency Radiowave Bands that are allocated for such use. For land vehicles, these Emergency Radiowave Bands include the Citizens Band frequencies f≈27.065 MHz. For marine vessels or vehicles, these Emergency Radiowave Bands include the frequencies f≈156.8 MHz. For airborne vessels or vehicles, these Emergency Radiowave Bands include the frequencies f≈121.5 and 243.0 MHz. This vehicle location and other transmitted information is intended to be received and acted upon by an abnormal event reporting facility (AERF) 29. Alternatively, the vehicle may also carry a cellular telephone 37, associated with and connected to the transmitter 22, that contacts a local AERF 29, such as the well known emergency telephone number 911 of a local telephone company, and reports the abnormal situation and location of the vehicle.

For purposes of definiteness, FIG. 1 illustrates the abnormal situation as collision of a land vehicle 13 with a tree or other structure 30, including another vehicle. If the vehicle 13 carries at least one collision-activated air bag, the abnormality sensor 31 may activate the transmitter 22 whenever the air bag release mechanism is activated. However, the invention is not limited to this situation or to this sensor activation means. One or more abnormality sensors 31 may be carried on the vehicle 13 or on a vehicle operator or occupant 15 to detect occurrence of any abnormal situation, including but not limited to the following situations: activation of a vehicle safety device, such as an air bag or other vehicle operator/occupant restraint mechanism; collision of the vehicle with another object (vehicle, tree, structure, person, a submerged structure, a portion of the shoreline, the Earth, etc.); unexpected immersion of part or all of the vehicle in water or other liquid, such as an ocean, river, lake or water-filled ditch or canal; unexpected inoperability of the vehicle; and unexpected inability of a vehicle occupant or operator to continue, because of a sudden change in that person's present health condition (heart attach, stroke, heat exhaustion, convulsion, etc.). Although FIG. 1 illustrates a situation in which the monitored vehicle 13 is a land vehicle, such as an auto, a bus or a truck, the invention also applies to monitoring of marine vessels and vehicles and of airborne vehicles, such as aircraft, hot air balloons and dirigibles.

The system may cause the transmitter 22 to communicate the chosen information once or to communicate the chosen information two or more times, in an intermittent manner. The system may also cause the transmitter to communicate the chosen information to more than one recipient, for example by sequentially or simultaneously broadcasting this information on each of a sequence of selected frequencies in one or several of the Emergency Radiowave Bands. For example, the chosen information could be broadcast on each of the discrete frequencies, including the channel 9 and 16 emergency frequencies allocated for Citizens Band and marine radio communications.

Figure 2:
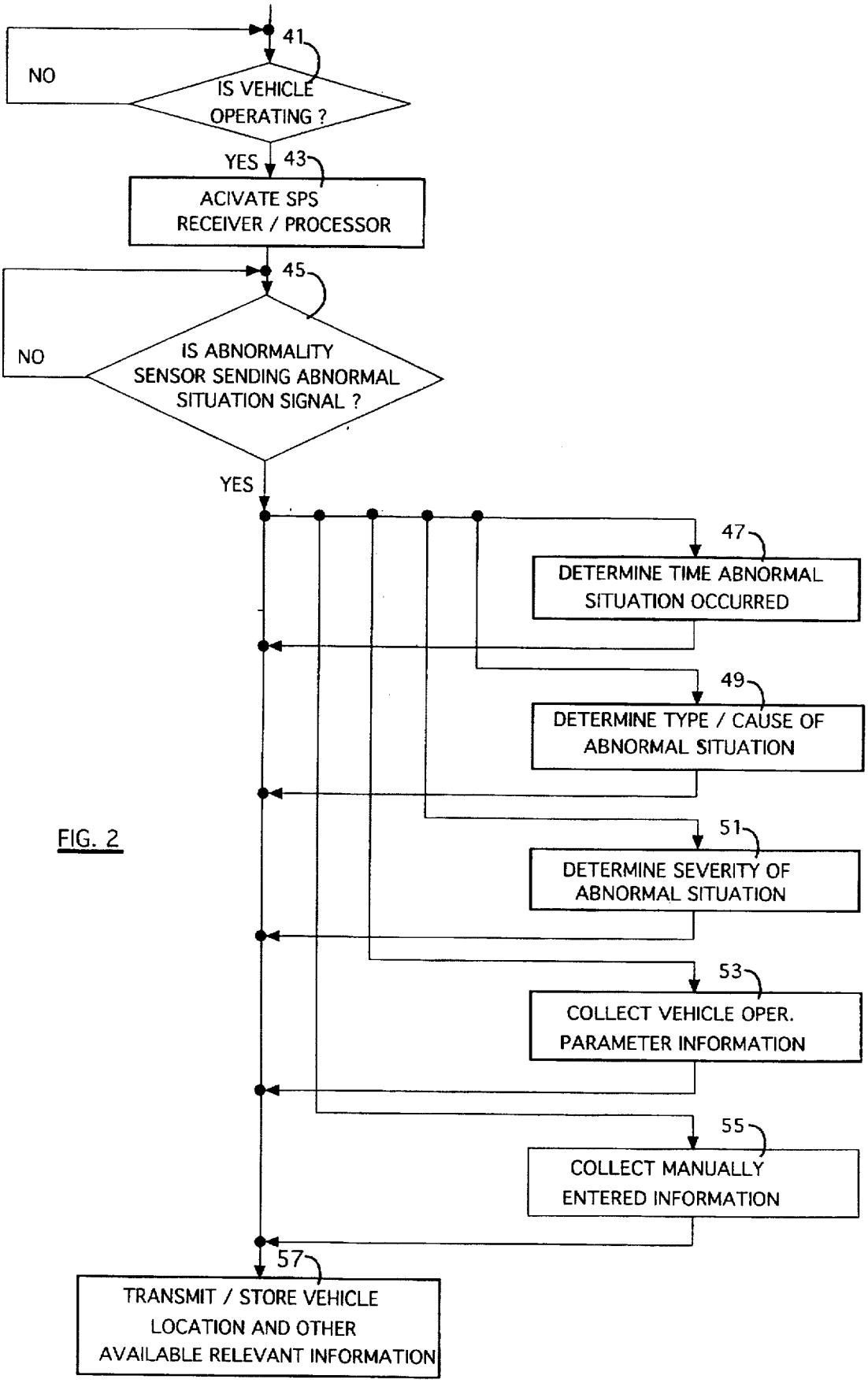
FIG. 2 is a flow diagram illustrating the signal processing logic for one embodiment of the invention carried on a vehicle.

FIG. 2 is a diagram illustrating logical steps that the system, including the receiver/processor 21, transmitter 22, abnormality sensor 31 and vehicle operating parameter sensor 33 in FIG. 1, might follow when the vehicle 13 is operating. In step 41, the system optionally determines if the vehicle 13 is being operated or was being operated in the immediate past. If not, the system optionally enters a "sleeper" mode until the question in step 41 is answered affirmatively. In step 43, the receiver/processor 21 and transmitter 22 are activated and begin receiving and processing DMS signals. In step 45, the system determines if any abnormality sensor 31 is sending an abnormal situation signal to the transmitter 22. If this sensor signal is not being sent, the receiver/processor 21 continues to receive and process the DMS signals and determines the present location of the vehicle 13 and/or time of observation but does nothing more. If an abnormality signal is being sent by the sensor 31, the system activates the transmitter 22 and begins communicating the fact that a vehicle abnormal situation has occurred, in step 57. Optionally, before the transmitter 22 begins its transmission, the system can also determine: (1) the time at which the abnormal situation first occurred, in step 47; (2) the type and/or cause of the abnormal situation that has occurred, in step 49; (3) the level of severity of, or other indicia of concern for, the abnormal situation, in step 51; (4) vehicle operating parameter information collected in a time interval preceding occurrence of an abnormality, in step 53; and/or (5) information manually entered by a vehicle occupant, in step 55. The information determined in steps 49 and/or 51 can be estimated or determined automatically by sensors carried on the vehicle or vehicle occupant, or, alternatively, can be entered by a vehicle occupant. If one or more of these optional information items is available, this optional information may be added to the DMS-based vehicle location information being communicated by the transmitter 22 to one or more AERFs 29 or other nearby recipients, in step 57. The system may also move directly from step 45 to step 57.

Figure 3:
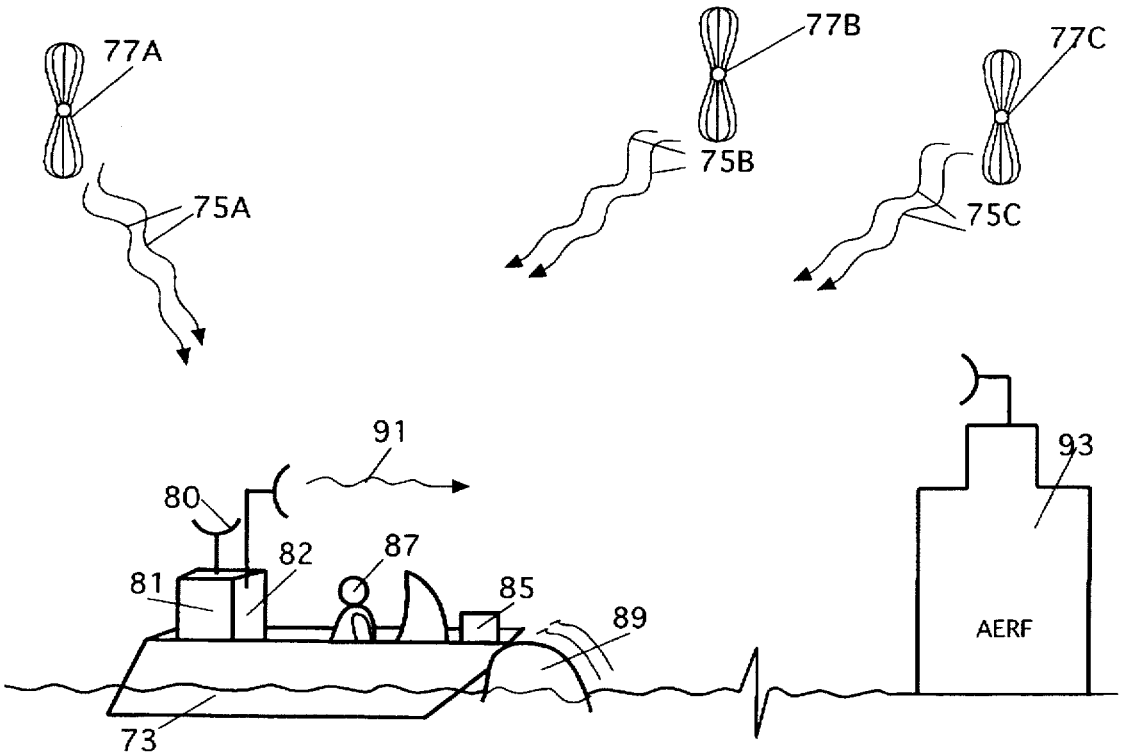
FIG. 3 is a schematic view of an embodiment of the invention in use, where a ground-based radionavigation system is used to report occurrence of a marine vessel abnormal event or condition.

FIG. 3 illustrates use of an embodiment of the invention by a marine vessel or vehicle 73, using a ground-based radionavigation system (DMS) that receives two or more signals 75A, 75B and 75C from fixed, ground-based navigation signal transmitters 77A, 77B and 77C. The navigation signals 75A, 75B and 75C are received by an antenna 80 mounted on the marine vessel 73 and are processed by a DMS receiver/processor 81 connected to a transmitter 83. An abnormal event sensor 85 is mounted on the marine vessel 73 or on an occupant 87 of the vessel. When occurrence of an abnormal event, such as collision with a submerged structure 89 is sensed by the sensor 85, the transmitter 83 is activated and begins to transmit a "distress" signal 91 including the present location of the vessel 73 (at the time the abnormal event occurred) and any other relevant information. This distress signal 91 is received and acted upon by an AERF 93 or any other nearby facility or receiver, in a manner analogous to the situation illustrated in FIG. 1.

A Satellite Positioning System (SPS) is a system of satellite signal transmitters, with receivers located on the Earth's surface or adjacent to the Earth's surface, that transmits information from which an observer's present location and/or the time of observation can be determined. Two presently operating systems, each of which qualifies as an SPS, are the Global Positioning System and the Global Orbiting Navigational System.

The Global Positioning System (GPS), which provides the satellite signals for position determination, is part of a satellite-based navigation system developed by the United States Defense Department under its Navstar program. A fully operational GPS includes up to 24 satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to three or more such satellites can be sued to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two L-band carrier signals: and L1 signal having a frequency f1=1575.42 MHz and an L2 signal having a frequency f2=1227.6 MHz. These two frequencies are integral multiples f1=1500 f0 and f2=1200 f0 of a base frequency f0=1.023 MHz. The L1 and L2 signals from each satellite are binary phase shift key (BPSK) modulated by predetermined pseudo random noise (PRN) codes that are different for each of the GPS satellites deployed. One motivation for use of two carrier signals L1 and L2 is to allow partial compensation for propagation delay of such a signal through the ionosphere, which delay varies approximately as the inverse square of signal frequency f (delay $\propto f^{-2}$). This phenomenon is discussed by MacDoran in U.S. Pat. No. 4,463,357, which discussion is incorporated by reference herein. When transit time delay through the ionosphere is determined, a phase delay associated with a given carrier signal can be determined.

Use of the PRN codes allows use of a plurality of GPS satellite signals for determining an observer's position and for providing navigation information. A signal transmitted by a particular GPS signal is selected by generating and matching, or correlating, the PRN code for that particular satellite. All PRN codes are known and are stored in GPS satellite signal receivers carried by ground observers. A first PRN code for each GPS satellite, sometimes referred to as a precision code or P-code, is a relatively long, fine-grained code having an associated clock rate of 10 f0=10.23 MHz. A second PRN code for each GPS satellite, sometimes referred to as a clear/acquisition code or C/A code, is intended to facilitate rapid satellite signal acquisition and is a relatively short, coarser-grained code having a clock rate of f0=1.023 MHz. The C/A code for any GPS satellite has a length of 1023 chips or time increments before this code repeats. The P-code for any GPS satellite has a length of precisely one week (7.000 days) before this code repeats. The GPS satellite bit stream includes information on the ephemeris of each GPS satellite, parameters identifying the particular GPS satellite, and corrections for ionospheric signal propagation delays. A useful discussion of the GPS and techniques for obtaining position information from the satellite signals is found in Guide To GPS Positioning, edited by David Wells, Canadian GPS Associates, 1986.

A second configuration for global positioning is the GLONASS system, placed in orbit by the former Soviet Union. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of 8/17 of a sideral day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+9 k/16) MHz and f2=(1.246+7 k/16) MHz, where k (=0, 1, 2, . . . , 23) is the channel or satellite number. Because the channel frequencies are distinguishable from each other, the P-code, and also the C/A code, is the same for each satellite. Reference to a Global Positioning System or GPS herein includes reference to a GPS satellite configuration and to a GLONASS satellite configuration.

A LORAN system uses a fixed master station, which broadcast a sequence of pulses, each about 45 μsec in length, at a rate of 20–34 per second and at a frequency of 1.85, 1.90 or 1.95 MHz (LORAN-A) or around 0.1 MHz (LORAN-C). Two or more fixed secondary stations, spaced apart a distance of 300 miles or more from the master station and from each other, receive the pulses and broadcast a sequence of synchronized response pulses of the same frequency. A LORAN antenna and receiver/processor receives a master station pulse and a secondary station and, from the time difference for receipt, determines a hyperbola in two dimensions of possible locations of the antenna. The intersection of hyperbolas determined for each such secondary station indicates the present location of the antenna. The LORAN-C system is discussed in detail in the U.S. Coast Guard book LORAN-C Handbook, published May 1980 by the U.S Government Printing Office.

A related British system, Decca, uses the LORAN geometry but uses a continuous wave signal, uses differential phase detection in place of time delay differences, and uses different broadcast frequencies for the master and secondary stations. A Shoran system, useful for marine and related navigation, uses transmitter frequencies of around 300 MHz and provides locations with an accuracy of about 75 feet.

A TACAN antenna and receiver/processor system is ground-based and combines features of a DMS with direction-finding features, using a single transmitting station. A TACAN system uses a rotating cardioid antenna pattern, superimposed on a fixed non-uniform antenna pattern that contains nine equally spaced lobes, to provide accurate bearing information. TACAN was originally developed and used for an aircraft carrier and uses two distinguishable frequencies.

Any other suitable satellite-based or ground-based DMS may also be used to implement this invention. The accuracy of vehicle location reported will vary with the particular DMS used.

We claim:

1. Apparatus for [notifying others that a vehicle accident or other abnormal situation has occurred and of the location of the vehicle] *vehicular communication*, the apparatus comprising:

a distance measuring system (DMS) signal antenna and receiver/processor [and an activatable transmitter], attached to a vehicle to be monitored, that receives and processes DMS signals from one or more DMS signal broadcasters to determine the location of the [antenna and, when the transmitter is activated,] *vehicle;*

*a transmitter attached to the vehicle* to communicate [this information to another person or facility that is spaced apart from the receiver/processor] *the location of the vehicle when the transmitter is activated*;

vehicle condition sensing means, attached to the vehicle, for sensing [the occurrence of at least one of a selected group of abnormal situations at the vehicle] *a predetermined situation*, the sensing means being [electronically] connected to the transmitter so that, when [one or more of the selected group of abnormal events or conditions occurs at the vehicle] *the situation is sensed*, the sensing means activates the transmitter [and] *which* communicates the location of the vehicle[, at approximately the time the abnormal situation occurs];

an operations sensor for *periodically* sensing the value of a vehicle operating parameter at [a sequence of times] *an interval of time* $\Delta t_s$ *and for outputting the sensed value*; and

[a temporary] *an* information storage memory[, connected to the vehicle condition sensing means,] that receives and [holds] *stores* the vehicle operating parameter values [sensed] *outputted* by the operations sensor[, for a time interval of selected length $\Delta t_s$ after each such value is received, and that holds these values for a time interval of length greater than $\Delta t_s$ as soon as a vehicle abnormal situation occurs].

2. The apparatus of claim 1, wherein said transmitter also communicates the time said [abnormal event or condition] *situation* occurred at said vehicle, after said transmitter is activated by said sensing means.

3. The apparatus of claim 1, wherein said transmitter also communicates information on the type or cause of said [abnormal] situation that has occurred.

4. The apparatus of claim 1, wherein said vehicle [abnormal] situation is occurrence of an accident in which said vehicle is involved, and said transmitter also transmits information [on the severity of] *describing* the vehicle accident.

5. The apparatus of claim 1, wherein said vehicle [abnormal] situation is inability of an operator of said vehicle to continue operating said vehicle.

6. The apparatus of claim 5, wherein said transmitter also communicates information on the condition of said vehicle operator [as a result of] *relating to* this inability.

7. The apparatus of claim 1, further comprising information entry means for entry of information by a vehicle occupant, wherein said transmitter also transmits information entered by a vehicle occupant.

8. The apparatus of claim 1, wherein said vehicle [abnormal] situation is inoperability of said vehicle.

9. The apparatus of claim 8, wherein said transmitter also communicates information [on the type or cause of] *describing* said vehicle inoperability.

10. The apparatus of claim 1, wherein said vehicle [abnormal] situation is drawn from the class consisting of: activation of a safety device for said vehicle, collision or crash of said vehicle, rolling of said vehicle, sudden or unexpected immersion of said vehicle in water or another liquid, inoperability of said vehicle, inability of a vehicle operator to continue operating said vehicle, and sudden change in the present health condition of an occupant of said vehicle.

11. The apparatus of claim 1, further comprising readout means for reading out said vehicle operating parameter values [as an understandable record] after said vehicle [abnormal] situation occurs.

12. The apparatus of claim 1, wherein said transmitter [transmits] *also communicates* said vehicle operating parameter values stored in said *information* storage [module after said abnormal situation occurs] *memory*.

13. The apparatus of claim 1, wherein said sensing means automatically activates said transmitter when said vehicle [abnormal] situation occurs.

14. The apparatus of claim 1, wherein said sensing means activates said transmitter, when said vehicle [abnormal] situation occurs, only if an occupant of said vehicle [takes an affirmative action that] indicates that communication by said transmitter should occur.

15. The apparatus of claim 1, wherein said transmitter communicates said vehicle location information by broadcasting said information on a selected Emergency Radiowave Band.

16. The apparatus of claim 15, wherein said transmitter broadcasts said vehicle location information at two or more [spaced apart] times after said [abnormal] situation occurs.

17. The apparatus of claim 15, wherein said transmitter broadcasts said vehicle location on two or more [distinct selected] frequencies.

18. The apparatus of claim 1, wherein said transmitter includes a cellular telephone and said transmitter communicates said vehicle location information by contacting one or more selected emergency reporting facilities, using the cellular telephone.

19. The apparatus of claim 1, wherein said vehicle is a land vehicle.

20. The apparatus of claim 1, wherein said vehicle is a marine vessel or an airborne vessel.

21. The apparatus of claim 1, wherein said DMS is drawn from the class of satellite-based radionavigation systems consisting of the Global Positioning System and the Global Orbiting Navigation System.

22. The apparatus of claim 1, wherein said DMS is drawn from the class of ground-based radionavigation systems consisting of LORAN, Decca and TACAN.

23. A *vehicle communication* method [for notifying others that a vehicle accident or other abnormal situation has occurred and of the location of the vehicle, the method] comprising the steps of:

providing a radionavigation distance measuring system (DMS) signal antenna and receiver/processor and an activatable transmitter, attached to a vehicle to be monitored, [that receives and processes] *the receiver/processor receiving and processing* DMS signals from [at least three] DMS signal broadcasters to determine the location of the [DMS antenna] *vehicle* and [to communicate] *the transmitter communicating* this information [to a recipient that is spaced apart from the receiver/processor] when the transmitter is activated;

monitoring the vehicle for the occurrence of [at least one of a selected group of abnormal situations at the vehicle] *a predetermined situation*, and, when [one or more of the selected group of vehicle abnormal situations] *the situation* occurs, activating the transmitter and communicating the location of the vehicle[, at approximately the time the abnormal situation occurs];

*periodically* sensing [and storing, for], *at* a selected time interval of length $\Delta t_s$, a [sequence of values] *value* of at least one vehicle operating parameter; and

[holding] *storing* this [sequence of] vehicle operating parameter [values for a time interval of length greater than $\Delta t_s$ as soon as a vehicle abnormal situation occurs] *value in an information storage memory.*

24. The method of claim 23, further comprising the step of sensing and transmitting [the type or cause of] *information describing* said vehicle [abnormal] situation [that occurs].

25. The method of claim 23, further comprising the step of sensing and transmitting the severity of said vehicle [abnormal] situation [that occurs].

26. The method of claim 23, further comprising the step of transmitting [at least one of] said stored [sequence of] vehicle operating parameter [values] *value* after said vehicle [abnormal] situation occurs.

27. The method of claim 23, further comprising the steps of:

allowing an occupant of said vehicle to enter [relevant] information concerning occurrence of said vehicle [abnormal] situation; and transmitting this occupant-entered information [to said recipient].

28. The method of claim 23, further comprising the step of choosing said [abnormal] situation from the group [of such situations] consisting of collision or crash of said vehicle, rolling of said vehicle, sudden immersion of said vehicle in water or another liquid, inoperability of said vehicle, inability of a vehicle operator to continue operating said vehicle, and sudden change in a health condition of an occupant of said vehicle.

29. The method of claim 23, further comprising the step of choosing said DMS from a class of satellite-based radionavigation location determination systems consisting of the Global Positioning System, and the Global Orbiting Navigational System.

30. The method of claim 23, further comprising the step of choosing said DMS from a class of ground-based radionavigation location determination systems consisting of LORAN, Decca and TACAN.

31. The apparatus of claim 1, wherein said transmitter also communicates [at least one of] said [values] *value* of said vehicle operating parameter stored in said [temporary] information storage memory, after said transmitter is activated by said sensing means.

32. The method of claim 23, further comprising the steps of:

determining the time said location of said vehicle is determined; and communicating this time information when said vehicle location information is communicated.

*33. The apparatus of claim 1, wherein said information storage memory stores the vehicle operating parameter values for a time of length greater than $\Delta t_s$ as soon as the situation occurs.*

*34. The apparatus of claim 1, wherein said operations sensor is disabled upon the occurrence of the situation.*

*35. The apparatus of claim 1, wherein said transmitter communicates the vehicle operating parameter values at the time that the situation is sensed.*

*36. The method of claim 23, further comprising the step of storing the vehicle operating parameter value in said information storage memory for a time of length greater than $\Delta t_s$ as soon as the situation occurs.*

*37. The method of claim 23, further comprising the step of disabling said operations sensor upon the occurrence of the situation.*

*38. The method of claim 23, further comprising the step of communicating the vehicle operating parameter value at the time that the situation is sensed.*

*39. A vehicle communication system, comprising:*

*a processor carried by the vehicle and adapted to determine the location of the vehicle;*

*a sensor carried by the vehicle for sensing a condition of the vehicle at a sequence of times separated by an interval of selected length $\Delta t_s$ to generate a sequence of output values;*

*an information storage memory that receives and stores said output values; and*

*a transmitter carried by the vehicle and adapted selectively to transmit the location thereof as determined by said processor, and adapted selectively to transmit said output values stored in said information storage memory.*

*40. The system of claim 39, further comprising a situation sensing means carried by the vehicle for sensing the occurrence of a situation, said transmitter being activated by said situation sensing means.*

*41. The system of claim 39, further comprising an antenna carried by the vehicle for receiving signals from a distance measuring system (DMS) and providing the signals to said processor.*

*42. The system of claim 40, wherein the situation is an abnormal situation.*

*43. The system of claim 39, wherein the information storage memory stores the output values for a period of time greater than $\Delta t_s$.*

*44. The system of claim 40, wherein the sensor is disabled upon the occurrence of a situation.*

*45. The system of claim 41, wherein the DMS is a satellite-based radionavigation system.*

*46. The system of claim 45, wherein the satellite-based radionavigation system is one of a Global Positioning System or a Global Orbiting Navigational System.*

*47. The system of claim 46, wherein the DMS is a ground-based radionavigation system.*

*48. The system of claim 47, wherein the radionavigation system is one of LORAN, Decca and TACAN systems.*

*49. The system of claim 1, wherein said vehicle location is communicated to a person or location that is spaced apart from the receiver/processor.*

* * * * *